Patented Apr. 7, 1936

2,036,760

UNITED STATES PATENT OFFICE 2,036,760

MANUFACTURE OF CALCIUM PHOSPHATES

William H. Knox, Jr., Nashville, Tenn., assignor to Victor Chemical Works, a corporation of Illinois No Drawing. Application July 21, 1934, Serial No. 736,434

6 Claims. (Cl. 23—109)

This invention relates to the production of calcium phosphates, and particularly to the preparation of calcium phosphates by the reaction of lime with phosphoric acid.

In my copending application Ser. No. 690,953, filed September 25, 1933, is described a method of preparing a chemically reactive lime. This lime is produced by heating lime at a temperature of 1000°–1500° C. for a period of one-half to twelve hours beyond the normal calcining period. In this treatment the lime is heated for a considerable period at high temperature after all of the carbon dioxide has been removed. The result of the treatment is to produce a fluorine-free lime, having a considerably greater density than ordinary lime, and at the same time having a much improved chemical reactivity with respect to phosphoric acid.

The lime product is particularly valuable for use in the production of phosphoric acid products. In reacting with phosphoric acid, the lime, instead of immediately slaking to a powder, first swells and then disintegrates into small lumps which react vigorously with the acid. In the production of calcium phosphates this is particularly advantageous in that the possibility of the formation of a phosphate protective layer on unreacted lime particles is precluded. This advantage likewise is present if milk of lime is prepared as a preliminary step. In either event there is less lime dust loss than is the case with ordinary quicklime. This is apparently due to the fact that the slowness of the initial reaction when the lime and water or phosphoric acid are mixed permits the substantially complete wetting of the lime lumps before the slaking reaction begins. This result is the more remarkable inasmuch as the dead burned lime, which the slowness of slaking and other physical characteristics show to be present, has always been avoided as a chemical reagent.

Furthermore, due to the increased air stability of lime prepared in accordance with the process of Ser. No. 690,953, it is not necessary to use lime immediately after burning to avoid foaming of the reaction mixture, as is the case with ordinary lime.

In carrying out the invention the processed lime is prepared. In the preparation of monocalcium phosphate, it may be reacted directly with phosphoric acid according to the following reaction:

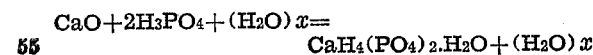

The lime may likewise be first slaked to produce hydrated lime and then reacted according to the following reaction:

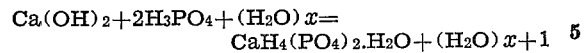

In both cases the free moisture is driven off by heat or vacuum or heat and vacuum.

In the preparation of di- or tricalcium phosphates the lime may be slaked, additional water added to produce a milk of lime, and then the milk of lime reacted with diluted phosphoric acid in the proper proportions to yield a precipitate of the desired di- or tricalcium phosphate according to the following general reactions:

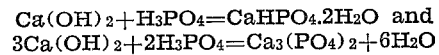

The precipitated di- or tricalcium phosphates are filtered off, washed and dried in the usual manner.

Dicalcium phosphate may also be made in a very satisfactory manner by adding the phosphoric acid to unslaked lime or a slaked lime, as in the case of the monocalcium phosphate.

It is preferred to use a fluorine-free phosphoric acid as described in the application of Knox and Cochran 691,382, filed September 28, 1933, since by the use of such an acid with the fluorine-free lime a fluorine-free product is produced which will contain in general less than 6 parts of fluorine per million parts of product. As described in said application, the lime should be low in silica content.

The foregoing detailed description is given for clearness of understanding only, and no unnecessary limitations should be understood therefrom, but the appended claims should be construed as broadly as permissible in view of the prior art.

What I claim as new and desire to secure by Letters Patent is:

1. The process of preparing calcium phosphates which comprises heating a low silica lime at a temperature of 1000–1500° C. for a period of 1 to 12 hours, said lower temperature corresponding to said longer period and vice versa, whereby a dead burned substantially fluorine-free lime is produced, and treating the lime with water and phosphoric acid to form a calcium phosphate, whereby the lime swells and disintegrates into small lumps which react vigorously with the acid to produce a calcium phosphate.

2. The process of preparing calcium phosphates which comprises reacting phosphoric acid with a low silica dead burned lime, whereby the lime swells and disintegrates into small lumps which react vigorously with the acid to produce a calcium phosphate.

3. The method as set forth in claim 2, in which the lime is preliminarily mixed with water.

4. The method as set forth in claim 2, in which the lime is preliminarily mixed with sufficient water to produce a milk of lime, and is then reacted with phosphoric acid in proportions to form a polycalcium phosphate.

5. The method as set forth in claim 2, in which the lime and phosphoric acid are reacted in proportions to produce monocalcium phosphate.

6. The method as set forth in claim 2, in which the lime is preliminarily mixed with water to produce hydrated lime and is then reacted with phosphoric acid in proportions sufficient to produce monocalcium phosphate and not greater than is required to produce dicalcium phosphate.

WILIAM H. KNOX, Jr.